US006661633B1

(12) United States Patent
Furuta et al.

(10) Patent No.: US 6,661,633 B1
(45) Date of Patent: Dec. 9, 2003

(54) PROTECTIVE ELEMENT

(75) Inventors: Kazutaka Furuta, Kanuma (JP); Norikazu Iwasaki, Kanuma (JP); Hisaya Tamura, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/626,911

(22) Filed: Jul. 27, 2000

(30) Foreign Application Priority Data

Aug. 4, 1999 (JP) .......................................... 11-221802

(51) Int. Cl.[7] .................................................. H02H 5/04

(52) U.S. Cl. ....................... 361/103; 361/104; 361/106; 337/158; 338/22 R

(58) Field of Search ................................ 361/103–106; 337/31, 158, 206; 338/22 R; 219/511, 548

(56) References Cited

U.S. PATENT DOCUMENTS

| | | | | |
|---|---|---|---|---|
| 3,950,741 A | * | 4/1976 | Schroeder | 338/23 |
| 4,780,598 A | * | 10/1988 | Fahey et al. | 219/491 |
| 6,300,859 B1 | * | 10/2001 | Myong et al. | 337/14 |

FOREIGN PATENT DOCUMENTS

| | | |
|---|---|---|
| JP | A-8-236305 | 9/1996 |
| JP | A-10-261505 | 9/1998 |

* cited by examiner

*Primary Examiner*—Kim Huynh
(74) *Attorney, Agent, or Firm*—Oliff & Berridge, PLC

(57) ABSTRACT

The protective element 20A includes a first PTC element 1, as well as a low-melting-point metal member 2, a heat-generating member 3 and a second PTC element. A the PTC material 1' constituting the first PTC element 1 serves as a substrate for the low-melting-point metal member 2, the heat-generating member 3 or the second PTC element. This protective element using the PTC element can be manufactured easily, with fewer components, and at lower costs. Moreover, the protective element can be made thinner.

4 Claims, 8 Drawing Sheets

FIG. 1A
FIG. 1B
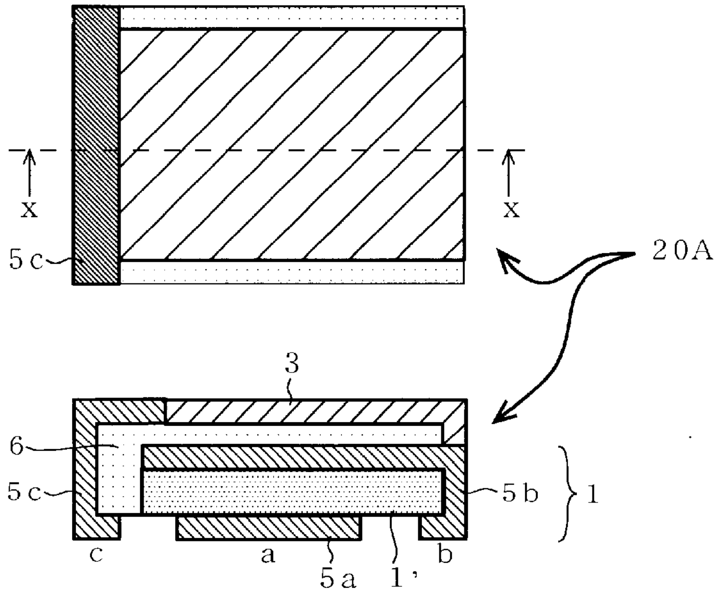
FIG. 2
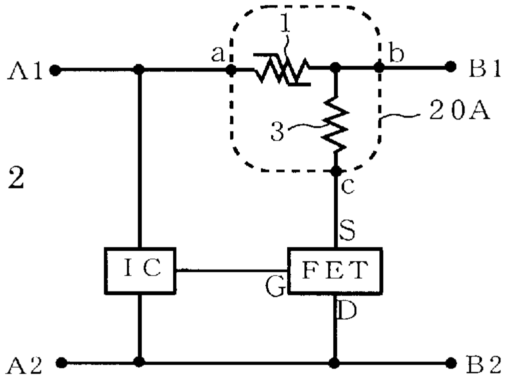
FIG. 3
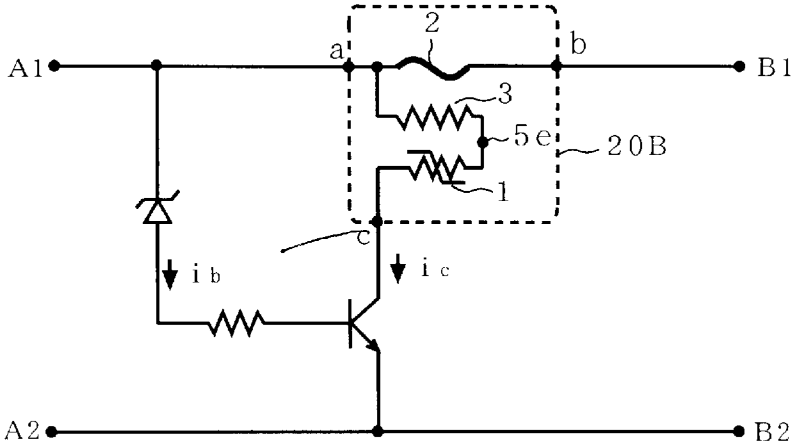

FIG. 4A1
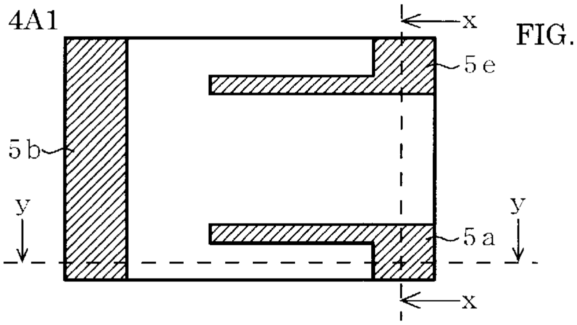
FIG. 4A2
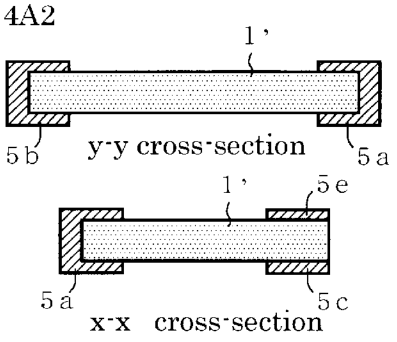
FIG. 4B1
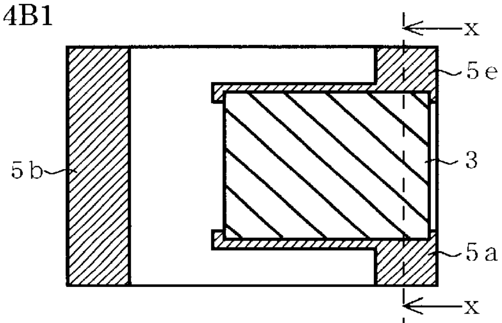
FIG. 4B2
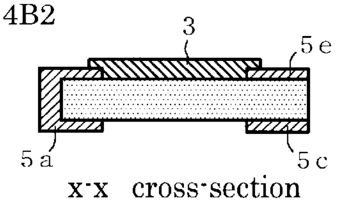
FIG. 4C1
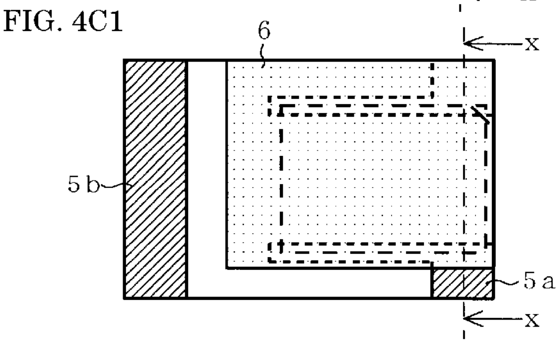
FIG. 4C2
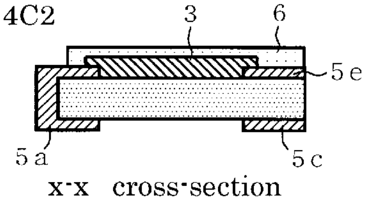
FIG. 4D1
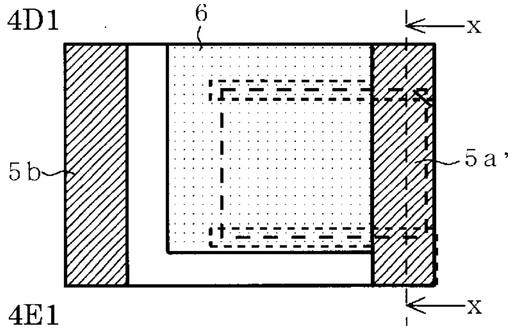
FIG. 4D2
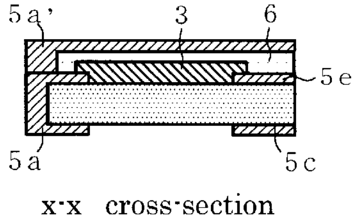
FIG. 4E1
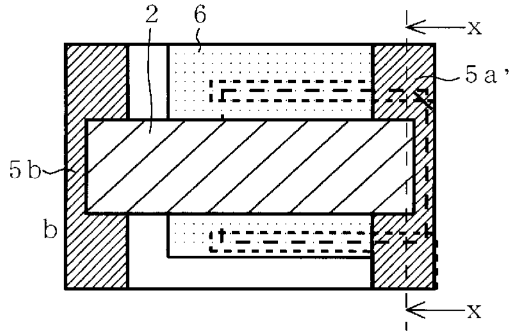
FIG. 4E2
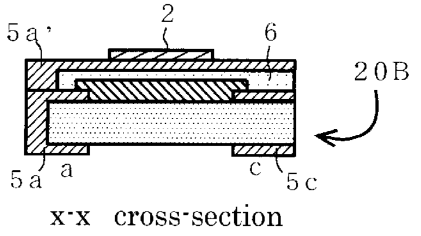

FIG. 6A1
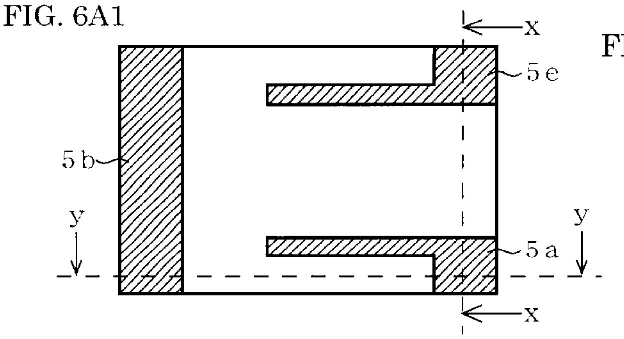
FIG. 6A2
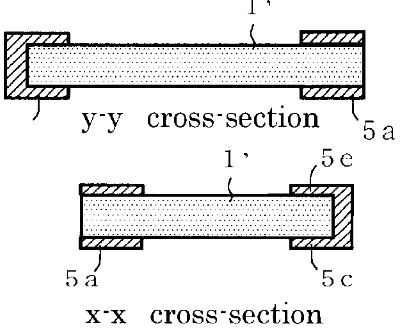
FIG. 6B1
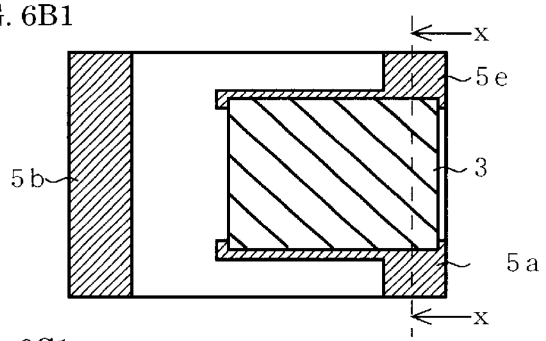
FIG. 6B2
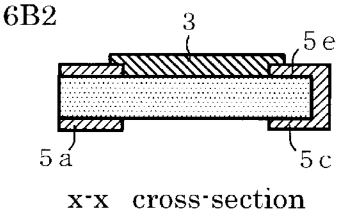
FIG. 6C1
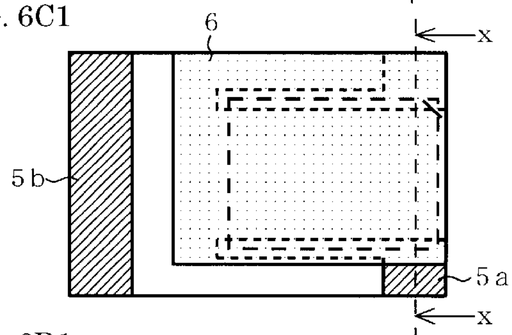
FIG. 6C2
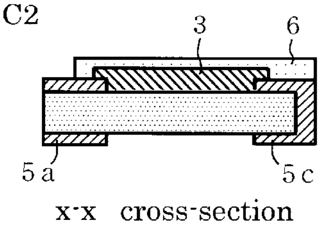
FIG. 6D1
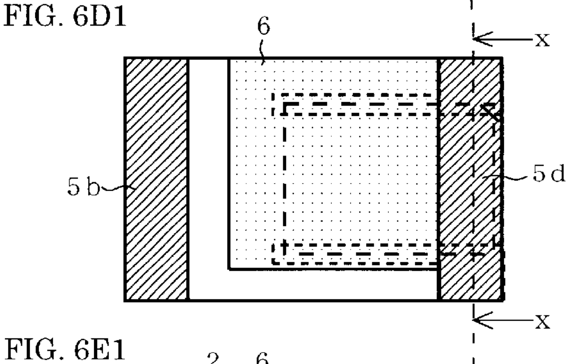
FIG. 6D2
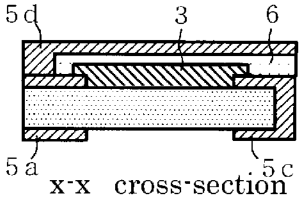
FIG. 6E1
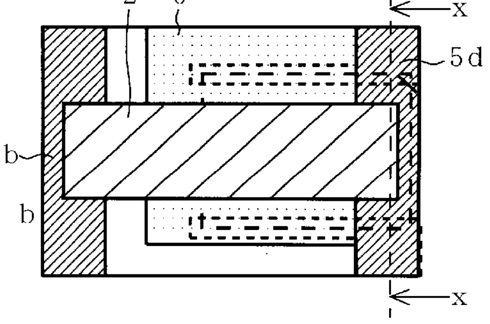
FIG. 6E2
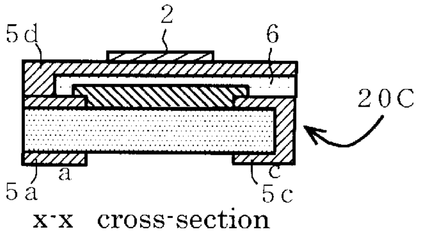

FIG. 8A1
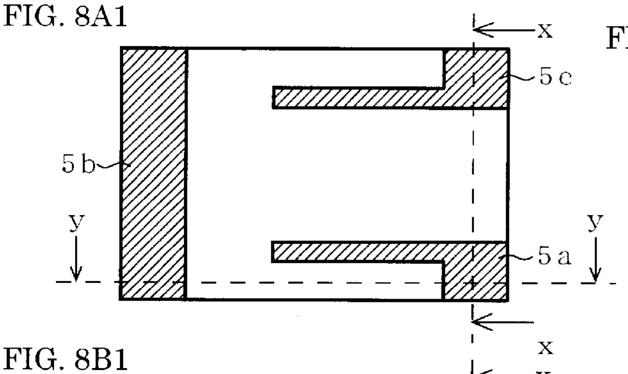
FIG. 8A2
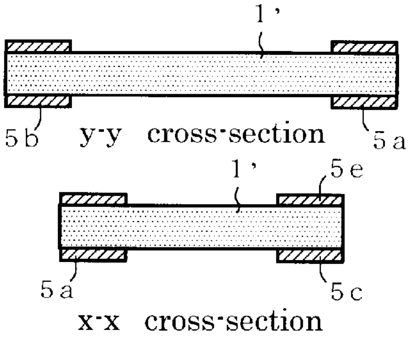
FIG. 8B1
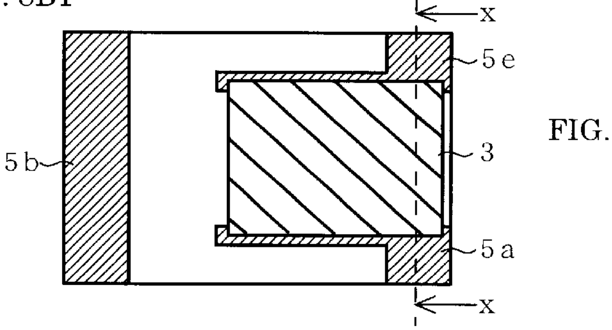
FIG. 8B2
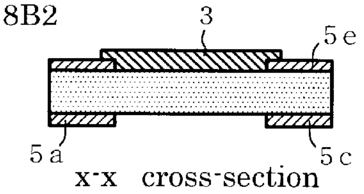
FIG. 8C1
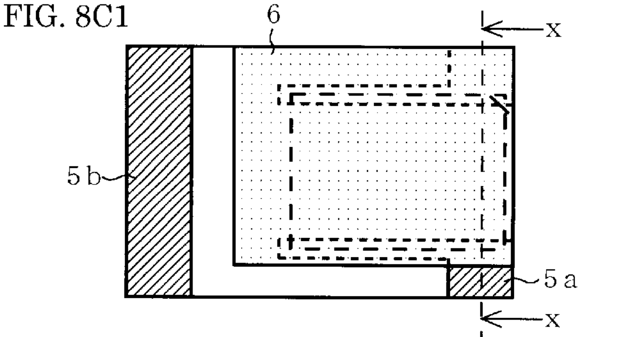
FIG. 8C2
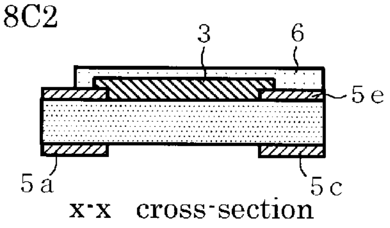
FIG. 8D1
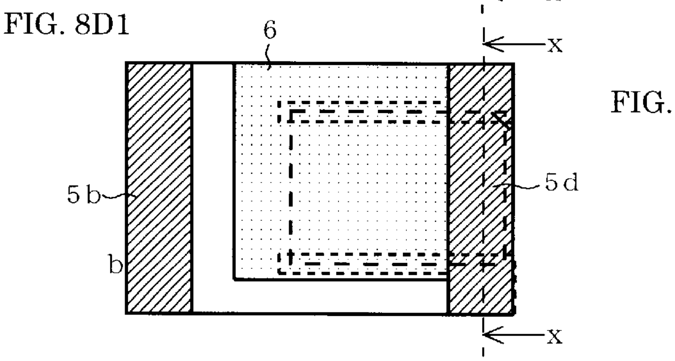
FIG. 8D2
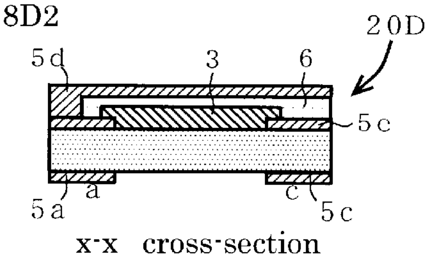

x-x cross-section

Prior Art

Prior Art

PROTECTIVE ELEMENT

BACKGROUND OF THE INVENTION

1. Field of the Invention

The present invention relates to a protective element for protecting a circuit to be protected from an overcurrent or an overvoltage by tripping of a PTC element.

2. Description of the Related Art

Conventionally, current fuses that are made of a low-melting-point metal, such as lead, tin or antimony that are heated and melted off by overcurrents, are known as protective elements for interrupting overcurrents to circuits to be protected.

Moreover, PTC (Positive Temperature Coefficient) elements are known as elements that, when overcurrent flows, generate heat, thereby increasing their resistance and limiting the current flowing through the circuit to be protected.

Furthermore, protective devices have been proposed, in which such a protective element is combined with a voltage sensing means, so that the circuit to be protected is protected not only from overcurrent but also from overvoltages.

FIG. 9 is a circuit diagram of such a protective device (see Japanese Patent Application Laid-Open No. 8-236305). In this circuit, the terminals A1 and A2 are connected to the electrode terminals of the device to be protected, such as for example a lithium-ion battery, and the terminals B1 and B2 are connected to the electrode terminals of, for example, a charging device.

In the protective element 20X used for the protective device in FIG. 9, a PTC element 1 and a low-melting-point metal member 2 are connected in series between a first terminal "a" and a second terminal "b" of the protective element 20X, and a heat-generating member 3 is connected between a third terminal "c" and an electrode 5*d*. Moreover, this protective device is provided with a Zehner diode and a transistor as a voltage sensing means and a switching means.

With this protective device, under normal conditions, current does not flow through the heat-generating member 3, and the PTC element 1 and the low-melting-point metal member 2 form a conduction path between the terminals of the device to be protected, such as a lithium-ion battery, and the electrode terminals of the charging device or the like. However, but when a reverse voltage that is larger than a predetermined breakdown voltage is applied to the Zehner diode, an abrupt base current $i_b$ flows, which causes a large collector current $i_c$ to flow through the heat-generating member 3 and heat the heat-generating member 3, the low-melting-point metal member 2 that is at a position near the heat-generating member 3 melts off, and the continuation of an overcharge in the device to be protected, such as a lithium-ion battery connected to the terminals A1 and A2, can be prevented.

On the other hand, when an overcurrent exceeding a certain value flows between the terminals A1 and B1, first, the PTC element 1 limits the current, then the low-melting-point metal member 2 melts off and interrupts the current.

In the protective element 20X used for the protective device as shown in FIG. 9, electrodes 5*a*, 5*b*, 5*c* and 5*d* are formed on a substrate 4, as shown in a top view by FIG. 10A and a cross-sectional view by FIG. 10B. The heat-generating member 3 is formed between the electrode 5*c* and the electrode 5*d*, and is covered with an insulating layer 6. The PTC element 1 is layered on the electrode 5*a*, the low-melting-point metal member 2 is formed extending over the PTC element 1, the electrode 5*b* and the electrode 5*d* on the substrate 4, and these parts are covered by a protective cap 7.

Thus, there is the problem that there is a limit to how much the height h of the protective element 20X can be reduced, so that it is not possible to make the device thinner. Moreover, the number of parts is great, so that there is the problem that it is difficult to reduce the manufacturing costs.

SUMMARY OF THE INVENTION

It is thus an object of the present invention to overcome the problems of the related art, and to provide a protective element using a PTC element, which can be manufactured easily, with fewer components, and at lower costs, and which can be made thinner.

The inventors of the present invention have found out that when the protective element is made of (i) a first PTC element and (ii) a low-melting-point metal member, a heat-generating member or a second PTC element, then the substrate, which hitherto used to be necessary for mounting the protective element on, becomes unnecessary, and the entire protective element can be made thinner, if a PTC material constituting (i) the first PTC element serves as a substrate for the (ii) low-melting-point metal member, the heat-generating member or the second PTC element, thus conceiving the protective element of the present invention.

In other words, the present invention provides a protective element comprising: a first PTC element; and a low-melting-point metal member, a heat-generating member or a second PTC element, where a PTC material constituting the first PTC element serves as a substrate for a low-melting-point metal member, a heat-generating member or a second PTC element.

BRIEF DESCRIPTION OF THE DRAWINGS

FIG. 1A is a top view of a protective element in accordance with the present invention, and FIG. 1B is a cross-section thereof.

FIG. 2 is a circuit diagram of a protective device using a protective element of the present invention.

FIG. 3 is a circuit diagram of a protective device using a protective element of the present invention.

FIGS. 4A1 to 4E1 and 4A2 to 4E2 illustrate the steps for manufacturing a protective element in accordance with the present invention.

FIGS. 6A1 to 6E1 and 6A2 to 6E2 illustrate the steps for manufacturing a protective element in accordance with the present invention.

FIGS. 8A1 to 8D1 and 8A2 to 8D2 illustrate the steps for manufacturing a protective element in accordance with the present invention.

DESCRIPTION OF THE PREFERRED EMBODIMENTS

Figure 5:
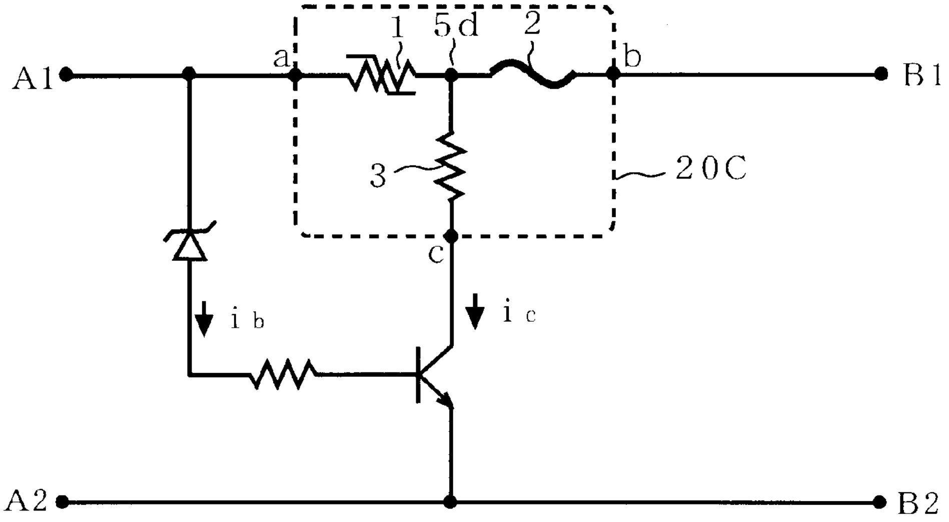
FIG. 5 is a circuit diagram of a protective element in accordance with the present invention.

The following is a detailed explanation of the present invention, with reference to the accompanying drawings. In the drawings, like symbols denote like or similar elements.

FIG. 1A is a top view of a protective element 20A in accordance with the present invention, and FIG. 1B is a cross-section thereof. FIG. 2 is a circuit diagram of a protective device using this protective element 20A.

As shown in FIG. 2, the protective element 20A is made of a PTC element 1 and a heat-generating member 3. To be more specific, an electrode 5*a* and an electrode 5*b* are provided on an upper and a lower surface of a rectangular PTC material 1' constituting the PTC element 1, as shown in FIG. 1. An insulating layer 6 is formed on the electrode 5*b*, electrodes 5*b* and 5*c* are formed on side surfaces, and the protective element 20A is provided with a heat-generating member 3. The letters "a", "b", and "c" denote the terminals of the protective element 20A.

There is no particular limitation on the PTC material itself that can be used for the PTC material 1', and it is possible to use for example so-called polymer PTC in which conductive particles have been dispersed into a crystalline polymer (for example, a polyolefin-based resin), barium-titanate-based PTC, or christobalite-based PTC (see JP H10-261505A).

Moreover, there is no particular limitation on the material and method for forming the electrodes 5*a*, 5*b*, and 5*c*, and it is possible to form them, for example, by printing and baking a silver. The electrodes 5*a* and 5*b* and the PTC material 1' sandwiched therebetween functions as the PTC element 1.

The insulating layer 6 can be made, for example by printing, with an inorganic insulator such as glass, or with various an organic resins such as an epoxy, acrylic or polyester resin.

The heat-generating member 3 can be made for example by printing with a carbon paste, a ruthenium oxide paste or the like.

If necessary, it is also possible to print a cover glass onto the heat-generating member 3, or cover it with a molding material, so as to protect the protection element 20A and prevent damaging during its handling.

In this protective element 20A, the PTC material 1' constituting the PTC element 1 also serves as a substrate for mounting the heat-generating member 3, so that the substrate that conventionally had to be provided separately from the PTC element becomes unnecessary, and the material costs can be reduced. Furthermore, the electrodes 5*a*, 5*b*, and 5*c*, the heat-generating member 3, and the insulating layer 6 are formed or layered flatly on the PTC material 1'. Consequently, the protective element 20A can be made thinner.

Moreover, since the element is integrated into one element, its heat efficiency is good, and the PTC element 1 can be heated quickly with the heat generated by the heat-generating member 3.

For the PTC element 1, a conventional element tripping at about 100° C. can be used. Consequently, with the protective element 20A, a protective element can be obtained that trips at temperatures that are lower than the melting point of the solder used for the mounting.

Moreover, in the protective element 20A, all the terminals a, b, and c of the protective element are formed on one surface of the PTC material 1', so that it is suitable for surface mounting.

There is no particular limitation concerning the circuit using the protective element 20A. For example, in the circuit shown in FIG. 2, the terminals A1 and A2 are connected to the electrode terminals of a device to be protected, such as a lithium-ion battery, and the terminals B1 and B2 are connected to the electrode terminals of a charging device or the like. Under normal conditions, almost no current flows through the heat-generating member 3, and a conduction path with the PTC element 1 in series is formed between the terminals A1 and B1. When an overcurrent flows between the terminals A1 and B1, the PTC element 1 trips, thereby limiting the overcurrent. On the other hand, when the IC senses an overvoltage exceeding a certain voltage between the terminals A1 and A2, the IC changes the gate potential of the FET, and allows a large source current to flow through the FET. Therefore, the heat-generating member 3 generates heat, so that the PTC element 1 trips, and the circuit to be protected can be protected from excessive charging.

FIG. 3 is a circuit diagram of a protective device using another protective element 20B in accordance with the present invention. This protective element 20B is provided with a low-melting-point metal member 2 between its terminals a and b, and a heat-generating member 3 and a PTC element 1 are connected in series between the terminals a and c. Like the conventional protective device shown in FIG. 9, the protective device in FIG. 3 is provided with a Zehner diode and a transistor as a voltage sensing means and a switching means.

Figure 9:
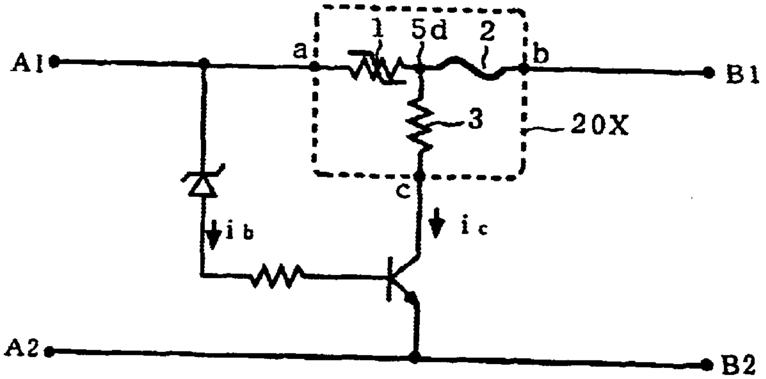
FIG. 9 is a circuit diagram of a conventional protective device.
Figure 10A:
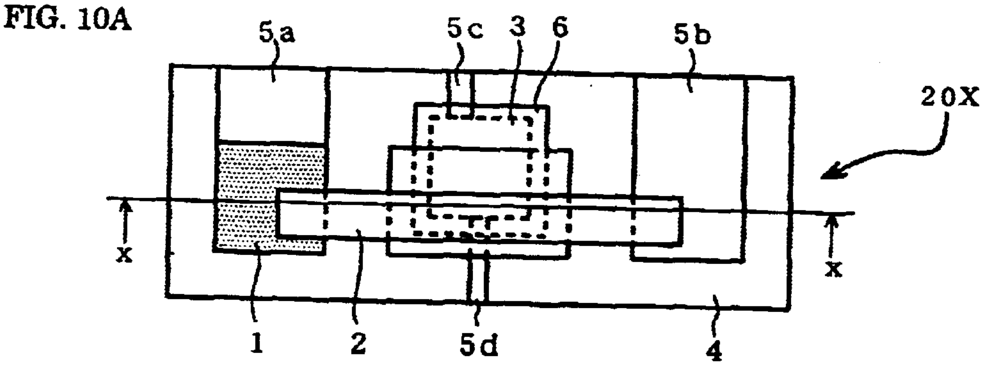
Prior Art FIG. 10A
FIG. 10A is a top view and FIG. 10B is a cross-section of a conventional protective element.
Figure 10B:
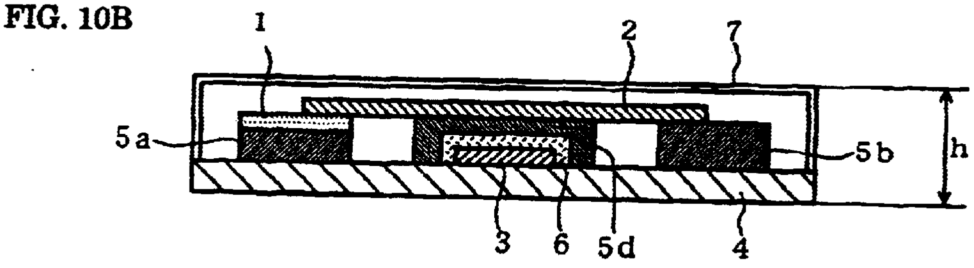
Prior Art FIG. 10B

Like the conventional protective device in FIG. 9, this protective device causes a collector current $i_c$ to flow. abruptly at an overvoltage, heating the heat-generating member 3, and melting off the low-melting-point metal member 2. After the low-melting-point metal member 2 has melted off, the continuation of current through the heat-generating member 3 is limited by the PTC element 1 by virtue of the fact that this current does not heat up the heat-generating member 3 too much. Thus, this protective device provides for enhanced safety.

Figure 11:
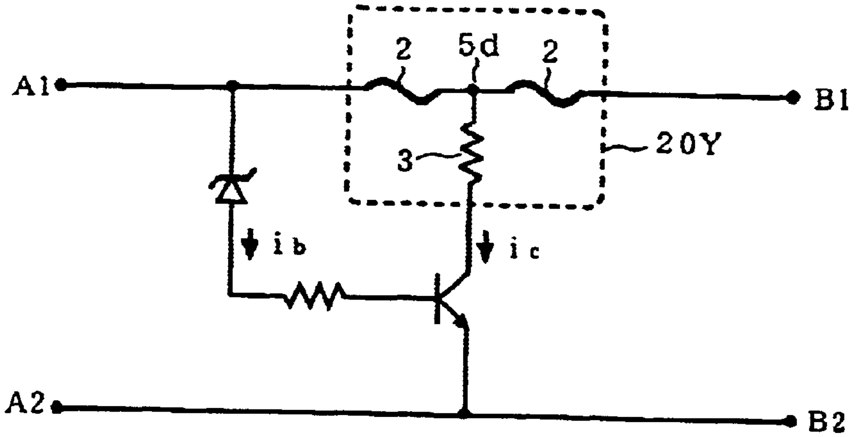
FIG. 11 is a circuit diagram of a conventional protective device.
Figure 12:
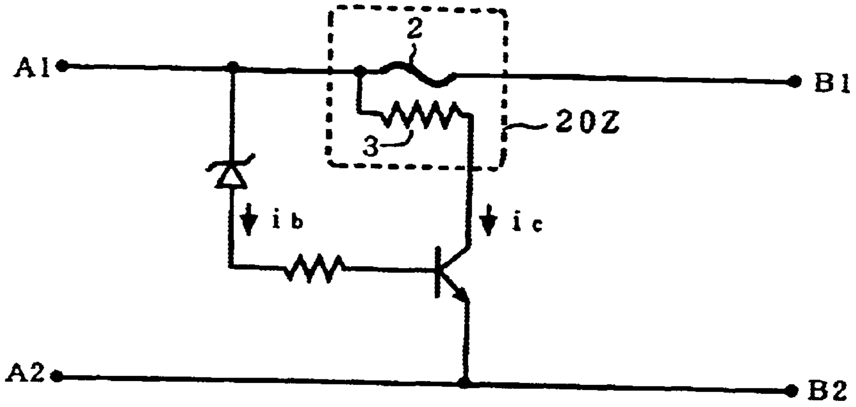
Prior Art FIG. 12
FIG. 12 is a circuit diagram of a conventional protective device.

Conventionally, as protective elements used in protective devices for preventing overvoltages and provided with a low-melting-point metal member on a heat-generating member, elements are known that are provided with an intermediate electrode 5*d* between two low-melting-point metal members 2, like the protective element 20Y shown in FIG. 11, one side of the heat-generating member 3 being connected to the intermediate electrode 5*d*. Also in the protective device using this protective element 20Y, a Zehner diode and a transistor are used as a voltage sensing means and a switching means. The reason why an intermediate electrode 5*d* has to be provided in the protective element 20Y in FIG. 11 is that when the low-melting-point metal members 2 on both sides of the intermediate electrode 5*d* melt off at an overvoltage, then the current to the heat-generating member 3 is completely interrupted. That is to say, when no intermediate electrode is provided, and a protective element 20Z is used that is provided with only one low-melting-point metal member 2 on the heat-generating member 3 as shown in FIG. 12, then a current may continue to flow through the heat-generating member 3, although the low-melting-point metal member 2 has melted off at an overvoltage, and there is the danger that the heat-generating member 3 continues to generate heat.

On the other hand, the afore-mentioned protective element 20B of the present invention as shown in FIG. 3 is not provided with an intermediate electrode 5*b* as in FIG. 9, but excessive heat generation by the heat-generating member 3 after the low-melting-point metal member 2 has melted off can be prevented because the PTC element 1 is connected in series with the heat-generating member 3.

The protective element 20B is manufactured as shown in FIGS. 4A1 to 4E1 and 4A2 to 4E2: First, as shown by the top view of FIG. 4A1 and the cross-sectional view of FIG. 4A2, the electrodes 5*a*, 5*b*, 5*c*, and 5*e* are formed on the two sides of the PTC material 1'.

Then, the heat-generating member 3 is formed, extending over the electrodes 5*a* and 5*e* (see top view in FIG. 4B1 and cross-sectional view in FIG. 4B2). The heat-generating member 3 is covered by the insulating layer 6 (see top view in FIG. 4C1 and cross-sectional view in FIG. 4C2). On top of the insulating layer 6, an electrode 5*a*' is formed so that is in connection with the electrode 5*a* (see top view in FIG. 4D1 and cross-sectional view in FIG. 4D2). Then, the low-melting-point metal member 2 is formed, extending over the electrode 5*b* and the electrode 5*a*' (see top view in FIG. 4E1 and cross-sectional view in FIG. 4E2). Thus, it is possible to obtain the protective element 20B of the present invention.

The PTC material 1', the electrodes 5*a*, 5*a*', 5*b*, 5*c*, and 5*e*, the heat-generating member 3, and the insulating layer 6 constituting the protective element 20B can be the same as in the afore-mentioned protective element 20A. For the low-melting-point metal member 2, it is possible to use one of the conventional materials used for current fuses or the like.

On the other hand, it is also possible to provide the protective element of the present invention with an intermediate electrode. An example of this is the protective element 20C, which has an intermediate electrode 5*d* as shown in FIG. 5. With this protective element 20C, safety can be improved even further due to the current-limiting function of the PTC element 1 and the melting of the low-melting-point metal member 2.

The protective element 20C can be manufactured as shown in FIGS. 6A1 to 6E1 and 6A2 to 6E2, following the manufacturing method for the protective element 20B described above.

Figure 7:
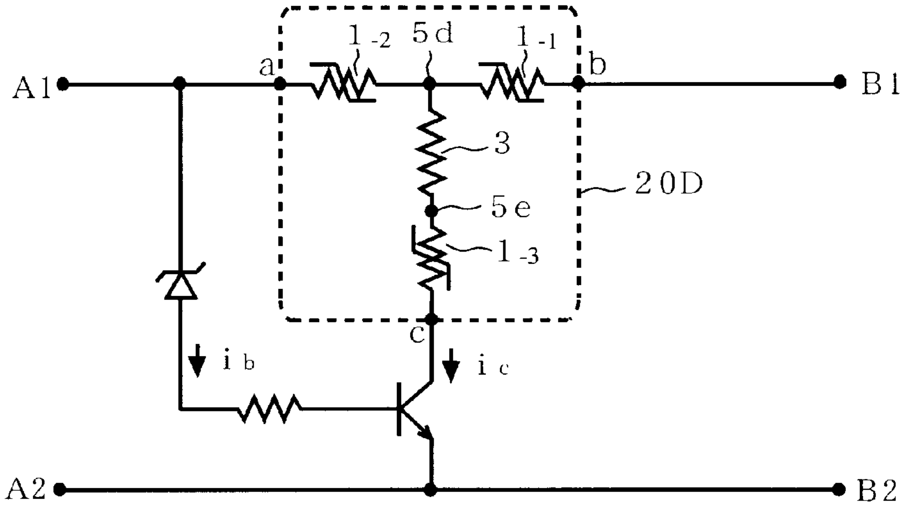
FIG. 7 is a circuit diagram of a protective device using a protective element in accordance with the present invention.

FIG. 7 is a circuit diagram of a protective device using yet a different protective element 20D in accordance with the present invention. In this protective element 20D a first PTC element 1—1 and a second PTC element 1–2 are provided on a heat-generating member 3, and an intermediate electrode 5*d* is provided between these two PTC elements 1—1 and 1–2. One end of the heat-generating member 3 is connected to the intermediate electrode 5*d*, and the other end of the heat-generating member 3 is connected to a third PTC element 1–3. Also this protective device has a Zehner diode and a transistor as a voltage detection means and a switching means, so that a collector current $i_c$ flows abruptly at an overvoltage, so that the heat-generating member 3 generates heat, and the device to be protected can be protected from an overcurrent by an increase in the resistance of the PTC element 1—1 or the PTC element 1–2. Consequently, if the terminals A1 and A2 are connected to the electrode terminals of a device to be protected, for example a lithium-ion battery, and the terminals B1 and B2 are connected to the electrode terminals of, for example, a charging device, the device to be protected, such as the lithium-ion battery, can be protected from overcharging. Even if there is an overvoltage after the PTC element 1—1 has failed and led to a short, the resistance of the second PTC element 1–2 rises due to the heat generation by the heat-generating member 3, and currents through the device to be protected can be limited. Furthermore, although there is the possibility that current continues to flow through the heat-generating member 3 even when the current through the device to be protected is limited at an overvoltage, the resistance of the third PTC-element 1–3, too, increases due to the heat generation of the heat-generating member 3, so that the current can be limited. Consequently, with this protective element 20D, the safety can be improved even better than with the aforesaid protective element 20C.

The protective element 20D can be manufactured as shown in FIGS. 8A1 to 8D1 and 8A2 to 8D2, following the manufacturing method for the protective element 20B described above.

The protective element of the present invention has at least one PTC element. As long as a heat-generating member, a low-melting-point metal member, as well as a second and third PTC element are formed taking the PTC material constituting this PTC element as a substrate, there is no limitation concerning the above examples, and various variations thereof are conceivable. For example, the shape of the PTC material, the number of electrodes formed thereon, the shape of the electrodes etc. can be selected as appropriate.

EXAMPLES

The following illustrates the present invention specifically, with reference to examples.

Example 1

As Example 1, the protective element of FIG. 1 was manufactured as follows.

A PTC material 1' was prepared with the following steps. First, a high-density polyethylene (HDPE: HI-ZEX 5000H by Mitsui Chemicals Corp.), which is a crystalline polymer, an ethylene-ethyl acrylate copolymer (EEA: NVC6170 by Nihon Unica Co., Ltd.), and conductive particles (MSB-10A by Nippon Carbon Co., Ltd.), which are small globular carbon particles plated with silver, were mixed at a ratio of 44:22:34 by weight, and after kneading at 190° C. with a pressure kneader, the mixture was pressed into a film of 300 $\mu$m thickness with a hot press (at 190° C., 5 kg/cm$^2$, 20 sec). The film was cut into pieces of 7 mm×4 mm size and taken as the PCT material 1' of the protective element.

The electrodes 5*a*, 5*b*, and 5*c* were formed using silver paste (by Fujikura Kasei Co., Ltd.).

After the components listed in Table 1 were pre-mixed, they were dispersed by three rolls to prepare an epoxy-based insulating paste, which was applied to form the insulating member 6.

TABLE 1

| Epoxy-based insulating paste | |
|---|---|
| Epoxy resin (YDF-170 by Toto Kasei Co., Ltd.) | 100 parts by weight |
| Alumina powder (A-42-6 by Showa Denko K.K.) | 200 parts by weight |
| Dicyandiamide (by ICI Japan, Ltd.) | 7.4 parts by weight |

The heat-generating member 3 was formed by applying carbon paste (FC-403R by Fujikura Kasei Co., Ltd.).

The size of the resulting protective element 20A was 7×4×0.35 mm (thickness), and was thus extremely thin.

Then, the protective element 20A was built into the circuit shown in FIG. 2, the electrode terminals of a lithium-ion battery were connected to the terminals A1 and A2, a stabilized power source was connected to the terminals B1 and B2, and the operation of the protective element 20A was examined. When the stabilized power source was set to 5V and 1A to charge the lithium-ion battery, a current started to flow through the heat-generating member 3 when the lithium-ion battery was near 4.3 V, and as a consequence, the resistance of the PTC element 1 increased to about 90 Ù, and the current decreased to 0.05 A. Thus, it could be verified that the protective element sufficiently limits the current at an overvoltage.

In a protective element using a PTC element of the present invention, a PTC material is used for the substrate on which a heat-generating member, a low-melting-point metal member, a second PTC element etc. are mounted, so that the protective element can be manufactured easily, with fewer components, and at lower costs. Furthermore, the protective element can be made thinner.

The entire disclosure of the specification, claims and drawings of Japanese Patent Application No. 11-221802 filed on Aug. 4, 1999 is hereby incorporated by reference.

What is claimed is:

1. A protective element, comprising:

an insulating layer;

a first PTC element formed of PTC material;

a low-melting-point metal member; and a heat-generating member, wherein the PTC material forming the first PTC element serves as a substrate for the low-melting-point metal member or the heat-generating member, wherein the low-melting-point metal member is provided between a first terminal of the protective element and a second terminal of the protective element, and the heat-generating member and the first PTC element are connected in series between the first terminal of the protective element and a third terminal of the protective element, and wherein at least one selection from the group consisting of the heat-generating member, the first terminal, the second terminal, the third terminal, and the insulating layer is formed by coating directly on the substrate.

2. A protective element comprising:

an insulating layer;

a first PTC element formed of PTC material;

a low-melting-point metal member; and a heat-generating member, wherein the PTC material forming the first PTC element serves as a substrate for the low-melting-point metal member or the heat-generating member, wherein the low-melting-point metal member and the first PTC element are provided in series between a first terminal of the protective element and a second terminal of the protective element, and the heat-generating member is connected to an intermediate terminal in between the low-melting-point metal and the first PTC element and a third terminal of the protective element, and wherein at least one selection from the group consisting of the heat-generating member, the first terminal, the second terminal, the third terminal, and the insulating layer is formed by coating directly on the substrate.

3. A protective element, comprising:

an insulating layer;

a first PTC element formed of PTC material;

a second PTC element;

a third PTC element; and a heat-generating member, wherein the PTC material forming the first PTC element serves as a substrate for the first PTC element, the second PTC element, the third PTC element, or the heat-generating member, wherein the first PTC element and the second PTC element are provided in series between a first terminal of the protective element and a second terminal of the protective element, and the heat-generating member and the third PTC element are connected in series to an intermediate terminal between the first PTC element and the second PTC element and a third terminal of the protective element, and wherein at least one selection from the group consisting of the heat-generating member, the first terminal, the second terminal, the third terminal and the insulating layer is formed by coating directly on the substrate.

4. A protective element having terminals, comprising:

an insulating layer;

a first PTC element formed of PTC material; and a heat-generating member, wherein the PTC material forming the first PTC element serves as a substrate separated by at least the insulating layer from the heat-generating member, and wherein one or more of the terminals and the insulating layer is formed by coating directly on the substrate, wherein a low-melting-point metal member is provided between a first terminal of the protective element and a second terminal of the protective element, and the heat-generating member and the first PTC element are connected in series between the first terminal of the protective element and a third terminal of the protective element.

* * * * *